(12) United States Patent
Lim et al.

(10) Patent No.: US 8,385,678 B2
(45) Date of Patent: Feb. 26, 2013

(54) IMAGE RESTORATION APPARATUS AND METHOD

(75) Inventors: Jae-Guyn Lim, Yongin-si (KR); Hyun-Wook Ok, Yongin-si (KR); Joo-Young Kang, Yongin-si (KR); Seong-Deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 949 days.

(21) Appl. No.: 12/153,443

(22) Filed: May 19, 2008

(65) Prior Publication Data
US 2009/0067742 A1 Mar. 12, 2009

(30) Foreign Application Priority Data
Sep. 12, 2007 (KR) .................. 10-2007-0092756

(51) Int. Cl.
*G06K 9/40* (2006.01)
(52) U.S. Cl. .................. 382/263; 382/254; 382/260
(58) Field of Classification Search .................. 382/254, 382/260, 263
See application file for complete search history.

(56) References Cited

U.S. PATENT DOCUMENTS

| 5,764,802 | A | 6/1998 | Simon | 382/236 |
| 6,285,804 | B1* | 9/2001 | Crinon et al. | 382/299 |
| 6,628,842 | B1* | 9/2003 | Nagao | 382/266 |
| 6,983,079 | B2 | 1/2006 | Kim | 382/275 |
| 2002/0067864 | A1* | 6/2002 | Matsuhira | 382/300 |
| 2002/0102029 | A1* | 8/2002 | Sekiguchi et al. | 382/243 |
| 2003/0048951 | A1* | 3/2003 | Rengakuji et al. | 382/232 |
| 2007/0286514 | A1* | 12/2007 | Brown et al. | 382/254 |
| 2008/0013861 | A1* | 1/2008 | Li et al. | 382/286 |
| 2008/0137978 | A1* | 6/2008 | Fu | 382/255 |

FOREIGN PATENT DOCUMENTS

| JP | 2004-201290 | 7/2004 |
| JP | 2005-332381 | 2/2005 |

* cited by examiner

Primary Examiner — John Strege
(74) Attorney, Agent, or Firm — Staas & Halsey LLP

(57) ABSTRACT

Provided is an image restoration method and apparatus, in which an image is restored by estimating the blur level of the image. The image restoration apparatus includes a block generation module which generates a plurality of overlapping blocks for an input image; a blur estimation module which generates a plurality of unit step responses for a current overlapping block from the overlapping blocks; a feature-map generation module which generates a feature map for the current overlapping block based on the unit step responses of the current overlapping block; and a filter application module which deblurs the current overlapping block by using a deconvolution filter to filter the feature map of the current overlapping block.

21 Claims, 14 Drawing Sheets

FIG. 4

| -1 | 0 | 1 |
|----|---|---|
| -2 | 0 | 2 |
| -1 | 0 | 1 |

SOBEL MASK FOR
X DIRECTION

| 1 | 2 | 1 |
|---|---|---|
| 0 | 0 | 0 |
| -1 | -2 | -1 |

SOBEL MASK FOR
Y DIRECTION

BLUR LEVEL=1

BLUR LEVEL=2

IMAGE RESTORATION APPARATUS AND METHOD

CROSS-REFERENCE TO RELATED APPLICATION

This application claims priority from Korean Patent Application No. 10-2007-0092756 filed on Sep. 12, 2007 in the Korean Intellectual Property Office, the disclosure of which is incorporated herein by reference in its entirety.

BACKGROUND OF THE INVENTION

1. Field of the Invention

The present invention relates to an image processing technique and, more particularly, to an image restoration method and apparatus in which an image is restored by estimating the blur level of the image.

2. Description of the Related Art

Actuators used for an optical automatic focus (AF) function are generally large in size and thus may not be suitable for reducing the size of mobile phone cameras. In order to address this, a method capable of replacing the existing optical AF function while reducing the size of mobile phone cameras has been suggested. However, this method does not involve the use of an actuator, and thus, camera lenses need to be fixed. However, when the lens is fixed, the blur level of an image captured by the camera varies according to the distance between a subject and the lens. Thus, it is necessary to estimate the blur level of an image and restore the image using a point spread function (PSF) corresponding to the blur level.

One of the most well-known conventional image restoration methods is disclosed in the article "Image Restoration of Space Variant Blurs by Sectioned Method," by H. J. Trussell and B. R. Hunt. This image restoration method includes calculating the blur level of a section using the central point of the section and a PSF. However, in this image restoration method, PSF is not estimated based on the blur level since it is assumed that the amount of blur is already known. Therefore, this image restoration method results in a relatively low accurate PSF estimation.

In the case of deblurring an image by using an inappropriate PSF, the image may not be properly deblurred, and various artifacts such as color defects or a ring effect may be generated in the image. It is thus very important to accurately estimate and refine PSF according to the type of image.

SUMMARY OF THE INVENTION

Aspects of the present invention provide an image restoration method and apparatus, in which an image is restored by deblurring the image according to the blur levels of a number of regions of the image.

Aspects of the present invention also provide an image restoration method and apparatus, in which a point spread function can be accurately estimated by locally estimating the blur level of an image.

Aspects of the present invention also provide an image restoration method and apparatus, in which a point spread function can be accurately estimated even further by refining an estimated point spread function.

However, aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided an image restoration apparatus including: a block generation module which generates a plurality of overlapping blocks for an input image; a blur estimation module which generates a plurality of unit step responses for a current overlapping block from the overlapping blocks; a feature-map generation module which generates a feature map for the current overlapping block based on the unit step responses of the current overlapping block; and a filter application module which deblurs the current overlapping block by using a deconvolution filter to filter the feature map of the current overlapping block.

According to another aspect of the present invention, there is provided an image capturing system including: a photographing element which captures an image of a subject; a driving circuit which adjusts a lens and a diaphragm; and an image restoration apparatus which deblurs the image captured by the photographing element, wherein the image restoration apparatus includes a block generation module which generates a plurality of overlapping blocks for an input image; a blur estimation module which generates a plurality of unit step responses for a current overlapping block from the overlapping blocks; a feature-map generation module which generates a feature map for the current overlapping block based on the unit step responses of the current overlapping block; and a filter application module which deblurs the current overlapping block by using a deconvolution filter to filter the feature map of the current overlapping block.

According to another aspect of the present invention, there is provided an image restoration method including: generating a plurality of overlapping blocks for an input image; generating a plurality of unit step responses for a current overlapping block from the overlapping blocks; generating a feature map for the current overlapping block based on the unit step responses of the current overlapping block; and deblurring the current overlapping block by using a deconvolution filter to filter the feature map of the current overlapping block.

BRIEF DESCRIPTION OF THE DRAWINGS

The above and other aspects and features of the present invention will become more apparent by describing in detail exemplary embodiments thereof with reference to the attached drawings, in which:

FIG. 4 illustrates a Sobel mask for an X direction and a Sobel mask for a Y direction;

DETAILED DESCRIPTION OF THE EXEMPLARY EMBODIMENTS

Figure 1:
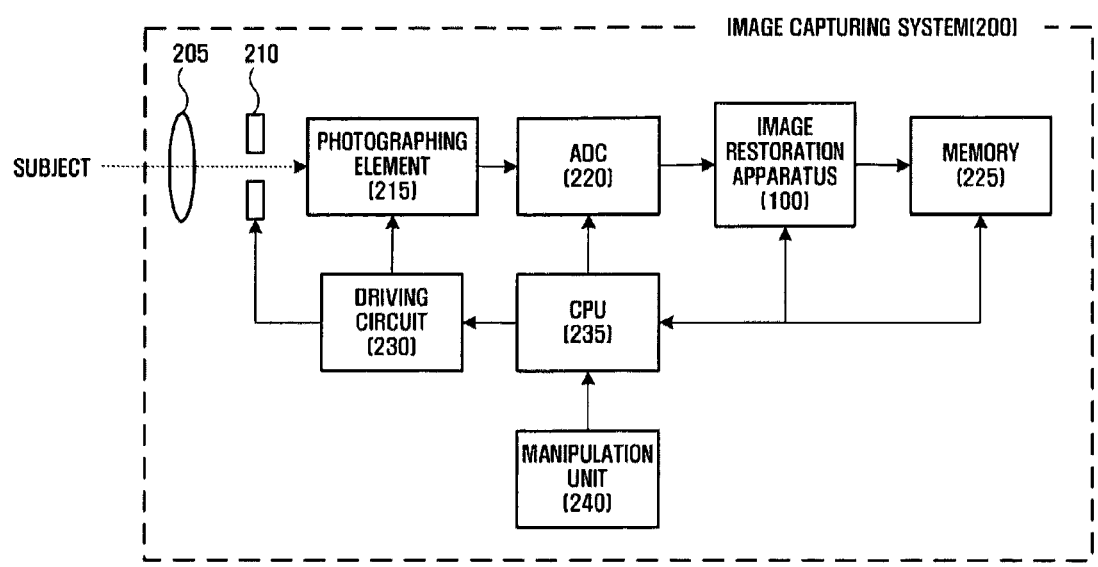
FIG. 1 illustrates a block diagram of an image capturing system according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

FIG. 1 illustrates a block diagram of an image capturing system 200 according to an exemplary embodiment of the present invention. Referring to FIG. 1, the image capturing system 200 may include a lens 205, a diaphragm 210, a photographing element 215, an analog-to-digital converter (ADC) 220, an image restoration apparatus 100, a memory 225, a driving circuit 230, a central processing unit 235, and a manipulation unit 240.

Image light reflected from a subject is incident upon the photographing element 215 through the lens 205 and the diaphragm 210. The photographing element 215 may be a charge-coupled device (CCD), a complementary metal-oxide semiconductor (CMOS) or a conventional image capturing device that is well known in the art to which the present invention pertains. An analog image signal formed on a camera plane of the image sensor 215 is converted into a digital signal by the ADC 220. The digital image signal is input to the image restoration apparatus 100. The image restoration apparatus 100 processes the input digital image signal, and thus enhances the quality of the input image. The image restoration apparatus 100 will be described later in further detail with reference to FIG. 2.

The image processed by the image restoration apparatus 100 is stored in the memory 225. The memory 225 may be a nonvolatile memory such as a read-only memory (ROM), a programmable ROM (PROM), an erasable PROM, an electrically erasable PROM (EEPROM), or a flash memory, a volatile memory such as a random access memory (RAM), or a storage medium such as a hard disc or an optical disc.

The manipulation unit 240 provides a signal to the CPU 235 which controls the image capturing system 200. The CPU 235 applies a control signal to the image restoration apparatus 100 or to the memory 225 and thus controls the storing of an image compensated for by the image restoration apparatus 100 in the memory 225. The CPU 235 also applies a control signal to the driving circuit 230 which controls the diaphragm 210 or adjusts the exposure time (shutter speed) or the automatic gain control (AGC) of the photographing element 215.

Figure 2:
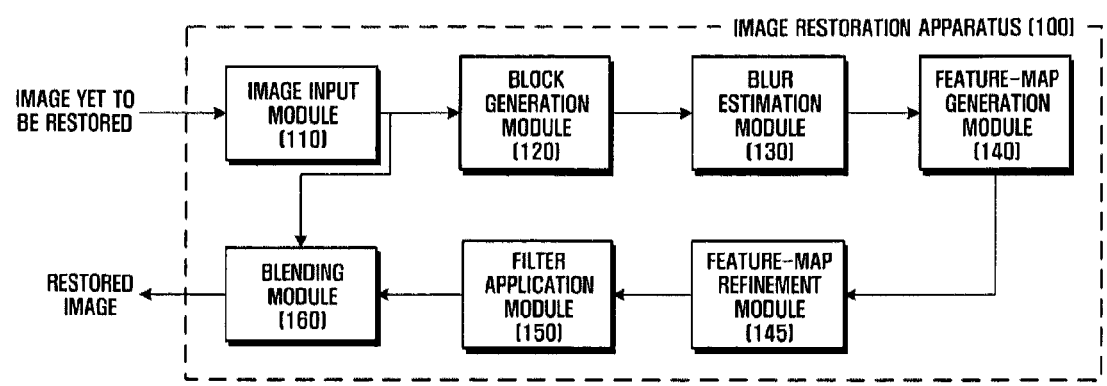
FIG. 2 illustrates a block diagram of an image restoration apparatus according to an exemplary embodiment of the present invention.

FIG. 2 illustrates a block diagram of the image restoration apparatus 100 shown in FIG. 1. Referring to FIG. 2, the image restoration apparatus 100 may be provided in the image capturing system 200 shown in FIG. 1 or may be provided in an external device such as a computer, a personal digital assistant (PDA), a portable multimedia player (PMP), or a mobile phone. The image restoration apparatus 100 may include an image input module 110, a block generation module 120, a blur estimation module 130, a feature-map generation module 140, a feature-map refinement module 145, a filter application module 150 and a blending module 160.

The image input module 110 receives an input image stored in a predetermined memory. The image input module 110 may separates a number of components (e.g., RGB or YCbCr) from the input image since the image generally includes three-dimensional components rather than one component. The image restoration apparatus 100 applies the same operating principles to all the components of the input image.

The block generation module 120 generates a plurality of overlapping blocks for the input image. The overlapping blocks are not blocks that are obtained by simply dividing the input image but blocks that partially overlap one another.

Figure 3:
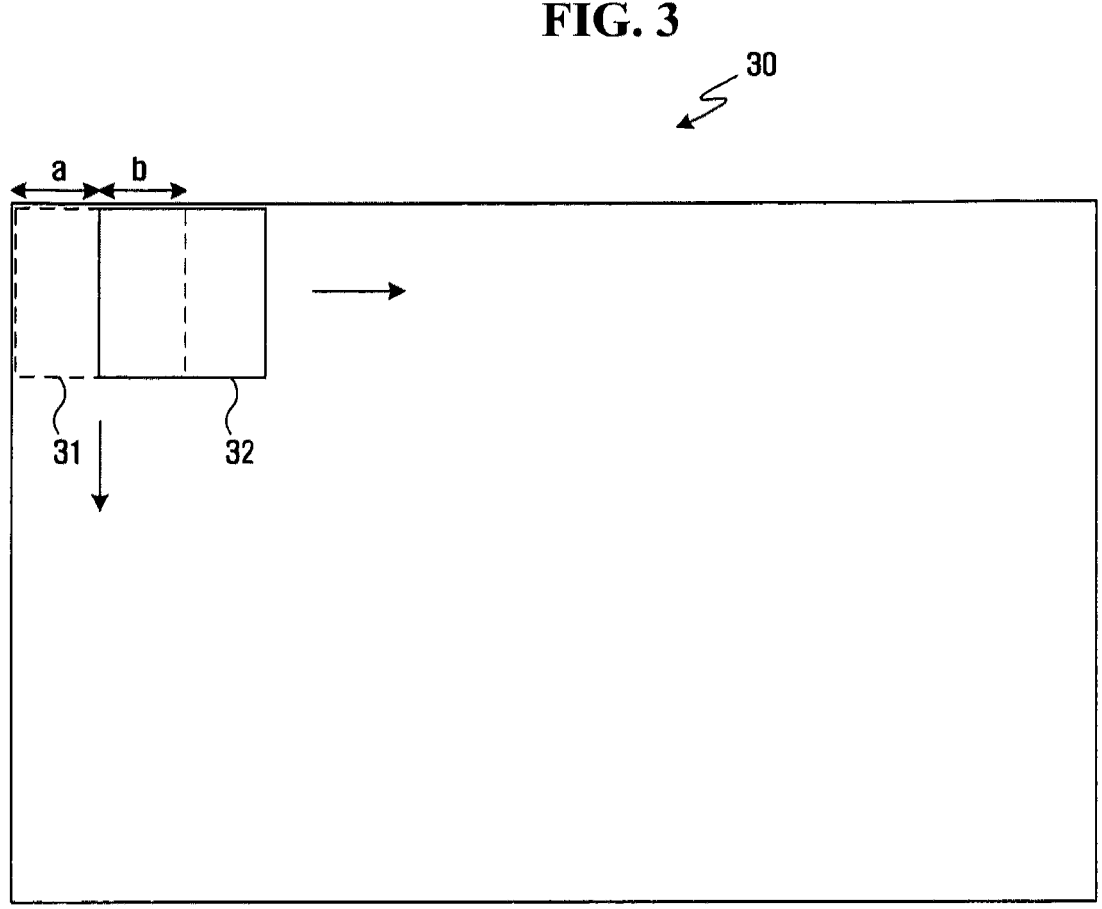
FIG. 3 illustrates a diagram for explaining a process of generating a plurality of overlapping blocks for an input image.

FIG. 3 illustrates a process of generating a plurality of overlapping blocks for an input image 30. Referring to FIG. 3, the size of the overlapping blocks may be less than the size of the input image 30. For example, the overlapping blocks may have a size of 100×100 (pixels).

A first overlapping block 31 is disposed on the upper left corner of the input image 30. A second overlapping block 32 is disposed to be a predetermined distance apart from the left side of the input image. The distance may be less than the horizontal length of the first and second overlapping blocks 31 and 32. If the horizontal length of the first and second overlapping blocks 31 and 32 is 100, a length B of the overlapping area of the first and second overlapping blocks 31 and 32 may be 100-A.

In this manner, a plurality of overlapping blocks that partially overlap one another may be sequentially generated along a latitudinal direction of the input image 30 and then along a longitudinal direction of the input image 30.

For example, if the input image 30 has a size of 800×600 and the distance A is 50, a total of 165 overlapping blocks having a size of 100×100 may be generated.

In this exemplary embodiment, a plurality of overlapping blocks that partially overlap one another are generated for generating and processing features in units of the overlapping blocks. Thus, it is possible to generate local feature data with enhanced continuity and reduce the probability of having the occurrence of a block effect in an output image.

Referring to FIG. 2, the blur estimation module 130 calculates a representative step response for each of the overlapping blocks generated by the block generation module 120 and estimates a blur level of each overlapping block. More specifically, the blur estimation module 130 detects edges from a current overlapping block and estimates a blur level of the current overlapping block based on the detected edges. The blur estimation module 130 may detect the edges from the current overlapping block using one or more Sobel masks, extract a valid edge from the detected edges using a non-maxima suppression method, generate a unit step response in consideration of estimated noise at the location of the valid edge, and estimate the blur level of the current overlapping block based on the unit step response.

A Sobel mask method is widely used to detect edges from an image. FIG. 4 illustrates a Sobel mask for an X direction and a Sobel mask for a Y direction. The Sobel mask for an X direction and the Sobel mask for a Y direction may both be applied to a 3×3 block, including a predetermined pixel. That is, 3×3 pixels in the 3×3 block are respectively multiplied by 3×3 components of each of the Sobel mask for an X direction and the Sobel mask for a Y direction, and the products are added, thereby obtaining an X-direction sum $S_x$ and a Y-direction sum $S_y$. If one of the X-direction sum $S_x$ and the Y-direction sum $S_y$ exceeds a predetermined threshold, the predetermined pixel may be determined to be part of an edge.

For example, if the X-direction sum $S_x$ of the predetermined pixel exceeds the predetermined threshold, the predetermined pixel may be determined to be part of an X-direction edge. If the Y-direction sum $S_y$ of the predetermined pixel exceeds the predetermined threshold, the predetermined pixel may be determined to be part of a Y-direction edge. The X-direction edge may correspond to a step-shaped profile of the values of a number of pixels that are adjacent to the predetermined pixel in an X-direction, and the Y-direction edge may correspond to a step-shaped profile of the values of a number of pixels that are adjacent to the predetermined pixel in a Y-direction.

However, edges detected from an image using the Sobel mask method may not necessarily be real noises, but may be noise components. Thus, the blur estimation module 130 may extract a valid edge from the edges detected from the current overlapping block using a non-maxima suppression method. In the non-maxima suppression method, the value of a predetermined pixel is compared with the values of pixels that are adjacent to the predetermined pixel, and the predetermined pixel is determined to be noise if the value of the predetermined pixel is much higher than the values of the pixels that are adjacent to the predetermined pixel. In this manner, pixels without noise may be extracted from the edges detected from the current overlapping block using the non-maxima suppression method. The extracted pixels without noise will hereinafter be referred to as valid pixels.

Thereafter, the blur estimation module 130 generates a unit step response at the location of the valid edge. The unit step response is a profile of the values of pixels that are adjacent to a center pixel of the valid edge. If the center pixel of the valid edge belongs to an X-direction edge, the blur estimation module 130 may generate a unit step response by obtaining the profile of the values of pixels that are adjacent to the center pixel of the valid edge in the X direction. If the center pixel of the valid edge belongs to a Y-direction edge, the blur estimation module 130 may generate a unit step response by obtaining the profile of the values of pixels that are adjacent to the center pixel of the valid edge in the Y direction.

Figure 5:
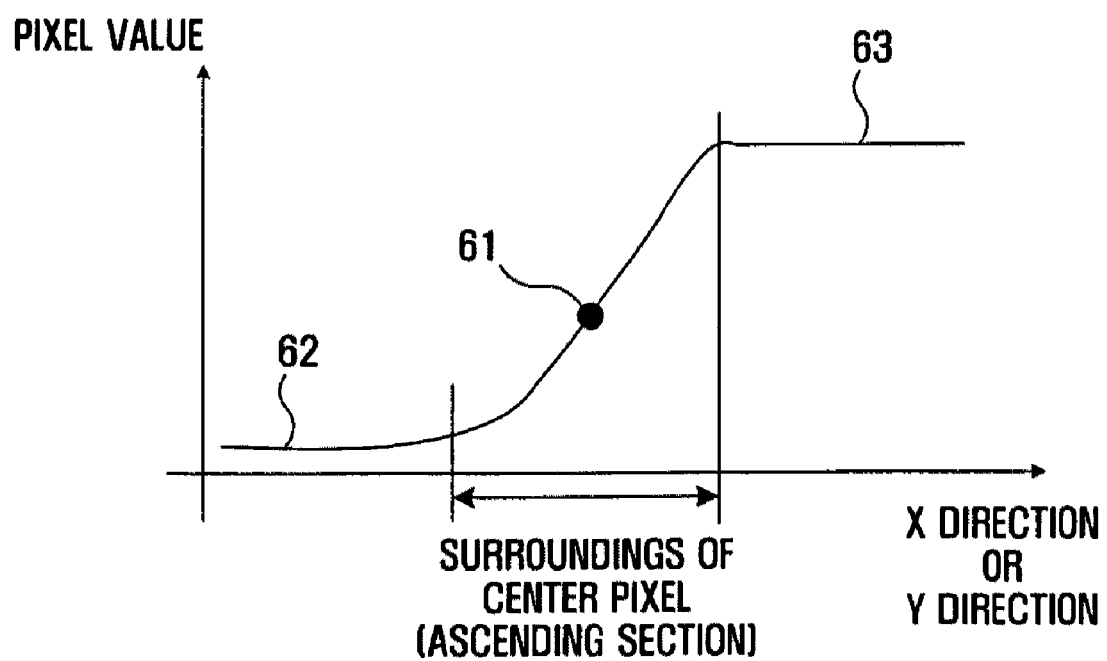
FIG. 5 illustrates a graph of a unit step response for pixels belonging to a valid edge.

The unit step response generated by the blur estimation module 130 may be as illustrated in FIG. 5. Referring to FIG. 5, the values of a center pixel 61 and pixels that are adjacent to the center pixel 61 form a descending or ascending curve, whereas the values of pixels that are distant from the center pixel 61 are generally uniform. A pixel value 62 and a pixel value 63, which are the uniform values that pixels distant from the center pixel 61 may have, may be respectively defined as a lowest level and a highest level of a unit step response. The number of pixels used to generate a unit step response may be arbitrarily determined. For example, about ten to twenty pixels may be used to generate a unit step response.

The generation of a unit step response may be performed for each of a plurality of pixels belonging to a valid edge detected from each overlapping block. As a result, as many unit step responses as there are valid pixels are generated. A unit step response may form an ascending curve or a descending curve. However, for clarity, it is assumed that a unit step response has an ascending curve. If the profile of the values of a center pixel and pixels that are adjacent to the center pixel has a descending pattern, the corresponding profile may be reversed left to right, thereby obtaining a profile having an ascending pattern.

The blur estimation module 130 generates a plurality of unit step responses for respective corresponding pixels belonging to the valid edge detected from the current overlapping block, and then calculates a representative step response that can represent the current overlapping block. The blur estimation module 130 may calculate the representative step response of the current overlapping block simply by averaging the unit step responses. However, in order to obtain an accurate representative step response, the blur estimation module 130 may normalize the unit step responses before averaging the unit step responses. As a result of the normalization, the lowest levels of the unit step responses are all normalized to a value of 0, and the highest levels of the unit step responses are all normalized to a value of 1.

Figure 6:
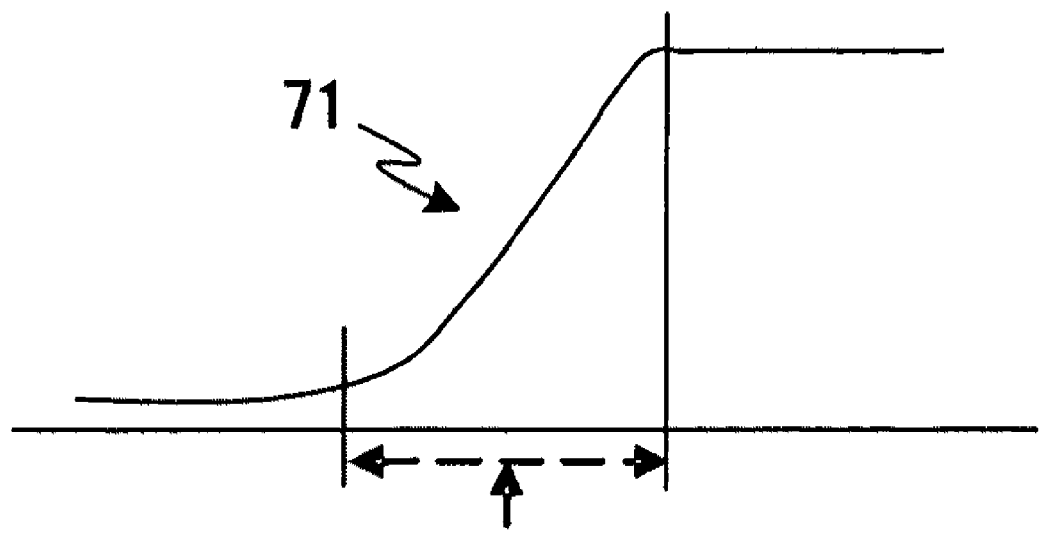
FIG. 6 illustrates graphs for explaining a process of determining a blur level based on a representative step response.
Figure 6:
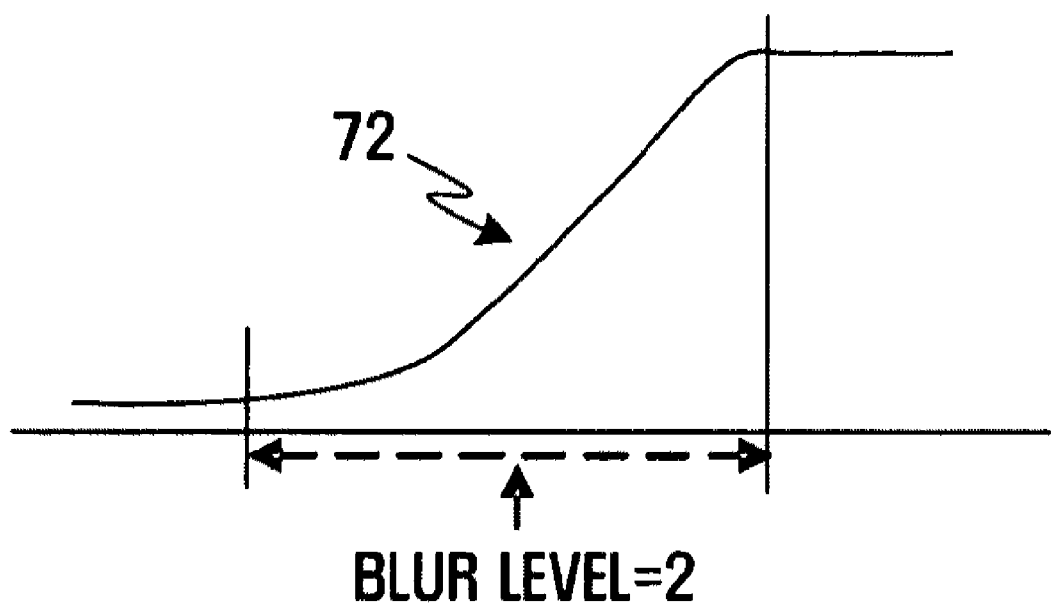

Thereafter, the blur estimation module 130 estimates a blur level of the current overlapping block based on the representative step response of the current overlapping block. In general, the larger the size of an ascending portion of a representative response, the higher the degree of blur. Thus, the blur level of the current overlapping block may be determined to be proportional to the size of the ascending portion of the representative step response of the current overlapping block. For example, referring to FIG. 6, a first representative step response 71 has a blur level of 1, and a second representative step response 72 has a blur level of 2. Likewise, the blur level of the current overlapping block may be determined to be inversely proportional to an average slope of the ascending portion of the representative step response of the current overlapping block.

The feature-map generation module 140 generates local features, i.e., a feature map, for the current overlapping block based on the blur level of the current overlapping block. The generation of a feature may be performed using an experimental method or an estimation method. Examples of the experimental method include a method (hereinafter referred to as "first experimental method") that involves the use of the distance between a subject and a camera as a parameter for calculating a feature map, and a method (hereinafter referred to as "second experimental method") that involves the use of a sigma value of a Gaussian blur filter.

In the first experimental method, the feature-map generation module 140 compares the blur level of the current overlapping block with default blur levels of a plurality of images of a subject captured at various distances from a camera with a predetermined lens and determines the distance between the subject and the camera experimentally based on a default blur level that matches the blur level of the current overlapping block. In general, a point spread function (PSF) corresponding to a lens distance of a camera is given as lens specification. Thus, it is possible to determine a PSF based on the blur level of the current overlapping block. In the first experimental method, the feature-map generation module 140 may provide a PSF as a feature map.

In the second experimental method, the feature-map generation module 140 searches a sigma value of a Gaussian blur filter that matches the blur level of the current overlapping block. That is, the feature-map generation module 140 blurs a clear image by applying a Gaussian blur filter to the clear image while varying a sigma value of the Gaussian blur filter, and then compares a blur level of the blurred image with the blur level of the current overlapping block, thereby searching for a sigma value of a Gaussian blur filter that matches the blur level of the current overlapping block. In the second experimental method, the feature-map generation module 140 may provide a Gaussian distribution of a Gaussian blur filter with a sigma value that matches the blur level of the current overlapping block as a feature map.

In the estimation method, the feature-map generation module 140 generates a matrix for estimating a PSF based on the blur level of the current overlapping block, and estimates a PSF using the matrix and the value of a center pixel of the representative step response of the current overlapping block.

The estimation of a PSF based on the blur level of the current overlapping block will hereinafter be described in further detail.

In order to estimate a PSF, the following assumption must be made: the amount by which an input image is out of focus is uniform along a circle of confusion (COC) and invariant across the entire input image.

A COC will hereinafter be described in further detail. When the distance between a subject and a camera plane is not appropriate, a blur phenomenon of an out-of-focus image occurs because one point on the surface of the subject does not correspond to one point on the camera plane, i.e., a focus position, but disperses. The dispersion of a point on a subject resembles a phenomenon in which a point source of light is projected in the shape of a circle, and this circle is referred to as COC. A COC is generated when an image captured by an image processing system is not placed at an accurate focus distance. The point source of light is projected in the shape of a diffusion circle when being at a distance near the focus distance. When an image is blurred by being out of focus, low-pass components of the image are emphasized. Accordingly, the amount by which an out-of-focus image is blurred may be determined by the size of high-frequency components of the out-of-focus image. The size of high-frequency components of an image may be considered as a dispersion value of a deteriorated image obtained by passing light of the original image through a high pass filter. That is, the higher the dispersion of high-frequency components of an image obtained by filtering, the lower the degree of blur of the image.

In practice, in many conventional digital focusing apparatuses, the out-of-focus blur of an image is modeled as a two-dimensional Gaussian function having an appropriate dispersion value.

Figure 7:
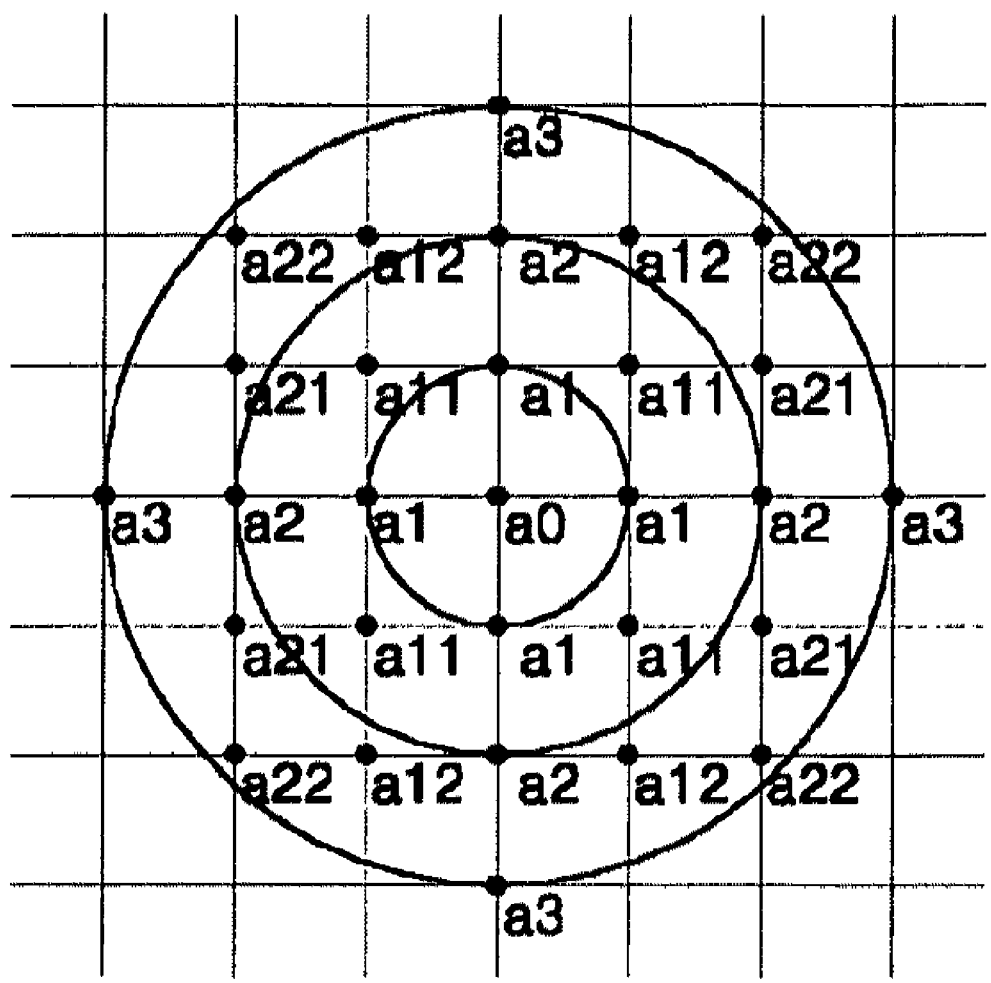
FIG. 7 illustrates a diagram of a two-dimensional (2D) point spread function and coefficients of the 2D point spread function.

Referring to FIG. 7, coefficients $a_0, a_1, \ldots, a_r$ of a two-dimensional (2D) circularly symmetric PSF may be determined based on a one-dimensional (1D) representative step response, as indicated by Equations (1) and (2):

$$PSF(m, n) = \begin{cases} (M+1-\sqrt{m^2+n^2})a_M + (\sqrt{m^2+n^2}-M)a_{M+1}, & \sqrt{m^2+n^2} \leq r \\ 0, & \text{elsewhere} \end{cases} \quad (1)$$

and $$S(0) = S(r-r) = PSF(r, 0) = a_r$$
$$\ldots$$
$$S(k) = S(r-m) = \qquad\qquad\qquad\qquad (2)$$
$$\quad S(r-m-1) + PSF(m, 0) + 2\{PSF(m, 1) + \ldots + PSF(m, N_m)\}$$
$$\ldots$$
$$S(r) =$$
$$\quad S(r-0) = S(r-1) + PSF(0, 0) + 2\{PSF(0, 1) + \ldots + PSF(0, r)\}$$

where (m, n) indicates coordinates of a PSF, M indicates the closest integer greater than $\sqrt{n^2+m^2}$, $a_M$ indicates a sample value of the PSF for an M-th pixel on a horizontal (or vertical) axis, S(k) indicates a k-th position of a mean step response, and $N_m$ indicates a value obtained by subtracting one from the number of points at which the PSF and the mean step response intersect each other and dividing the result of the subtraction by 2. The value $N_m$ may be the closest integer smaller than $\sqrt{r^2-m^2}$.

The coefficients $a_0, a_1, \ldots, a_r$ and $a_{mn}[=PSF(m, n)]$ are weighted values greater than 0 and smaller than 1. Referring to FIG. 7, $a_{12}, a_{21}$ and $a_{22}$ indicate values between the coefficients $a_1$ and $a_2$ and satisfy the following equations: $a_{12}=a_{21}=(3-\sqrt{5})a_2+(\sqrt{5}-2)a_3$; and $a_{22}=(3-\sqrt{8})a_2+(\sqrt{8}-2)a_3$.

The sample value $a_M$ may be determined by substituting Equation (1) into Equation (2). Once the sample value $a_M$ is determined, all the coefficients $a_0, a_1, \ldots, a_r$ of a PSF may be determined.

As described above, the feature-map generation module 140 may generate a feature map (e.g., a PSF) and correct the feature map. The correction of a PSF may be performed in consideration of the possibility that some coefficients of the PSF may be erroneous. More specifically, the correction of a PSF may be performed by applying a smoothing function such as a bilinear filter or a bi-cubic filter to a plurality of coefficients of the PSF.

Figure 8:
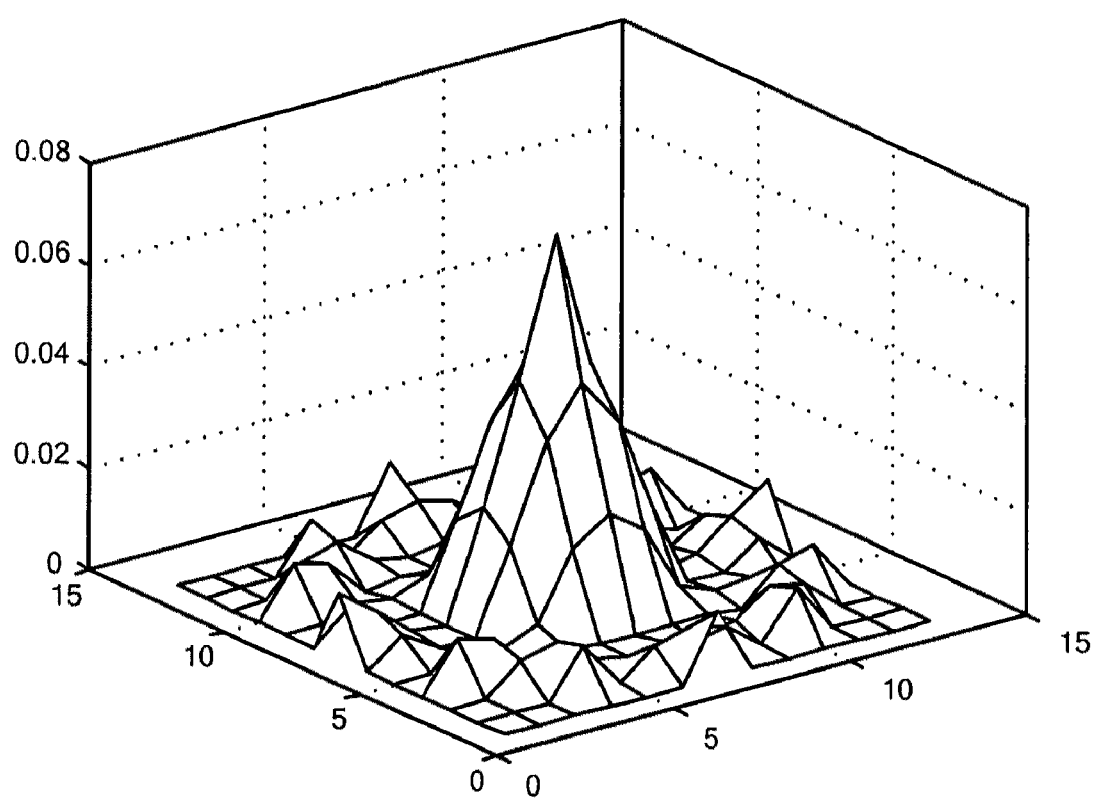
FIG. 8 illustrates a diagram of a point spread function for one overlapping block.

The feature-map generation module 140 may generate a feature map for each of the overlapping blocks generated by the block generation module 120. FIG. 8 illustrates a PSF for one overlapping block. The shape of PSF may vary from one overlapping block to another. The size of a PSF may vary according to a blur level of a representative step response.

The feature-map refinement module 145 refines a feature map generated by the feature-map generation module 145. More specifically, the feature-map refinement module 145 may correct incorrect coefficients of a feature map and/or generate coefficients that are missing from the feature map. Incorrect coefficients of a feature map and coefficients that are missing from a PSF will hereinafter be collectively referred to as "abnormal coefficients."

Figure 9:
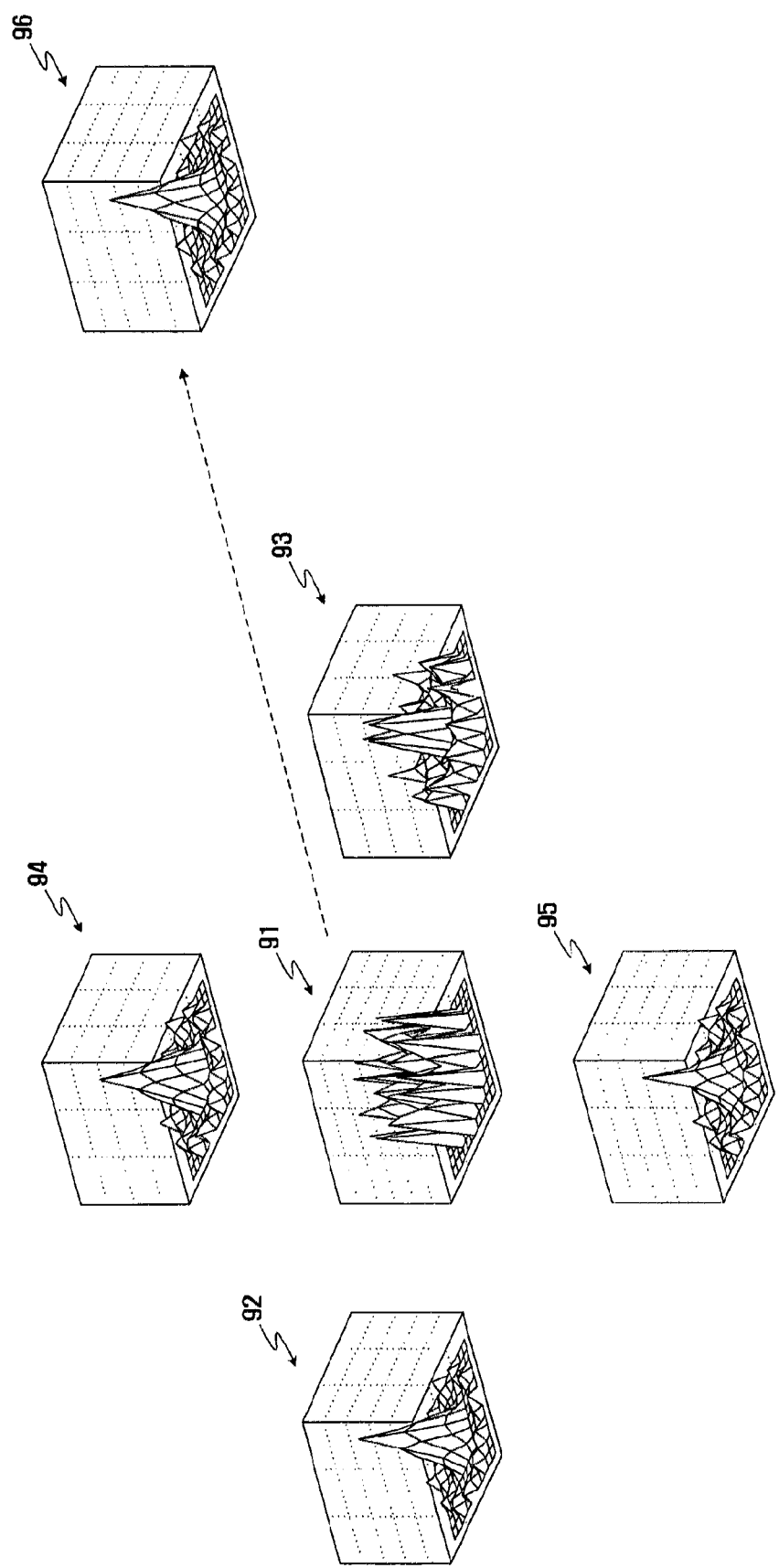
FIG. 9 illustrates a diagram for explaining a process of refining a feature map.
Figure 10:
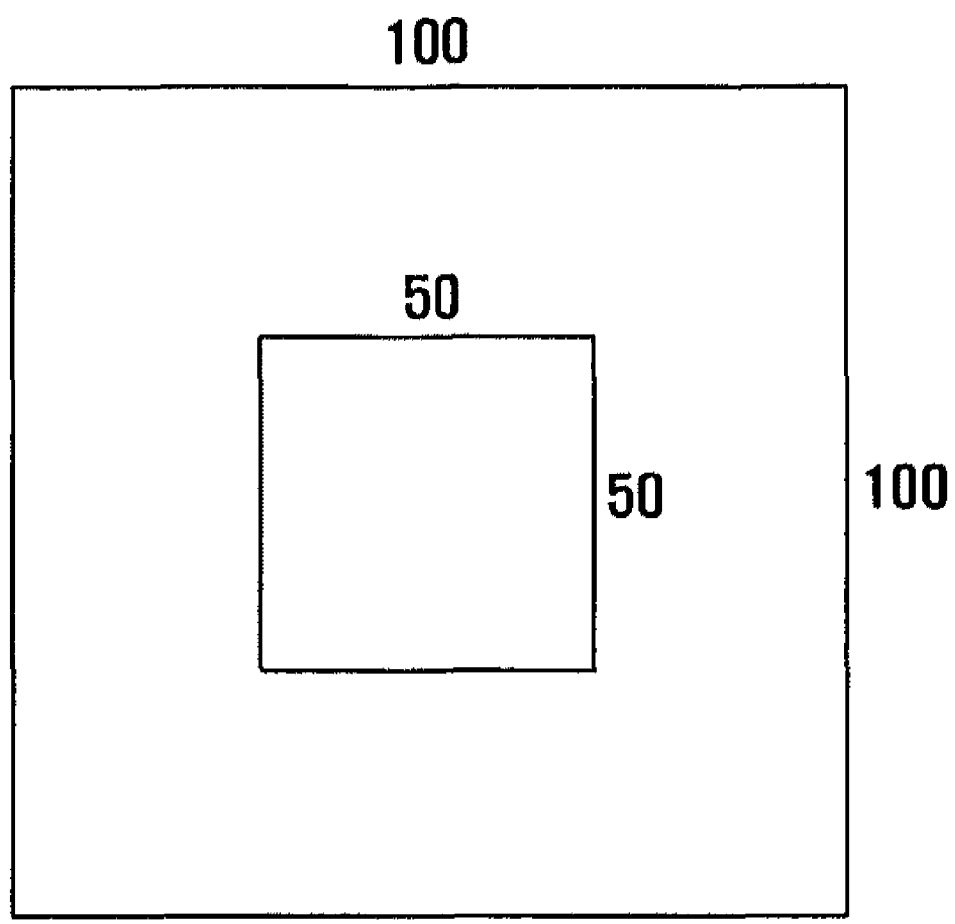
FIG. 10 illustrates a diagram of a sub-block of an overlapping block.

Referring to FIG. 9, in order to refine a feature map 91 of a current overlapping block, feature maps 92, 93, 94 and 95 of overlapping blocks that are adjacent to the current overlapping block are required since feature maps of overlapping blocks that are adjacent to one another are highly likely to be similar. In the embodiment of FIG. 9, four overlapping blocks that are adjacent to the current overlapping block are used to refine the feature map 91 of the current overlapping block. However, the present invention is not restricted to this. That is, the number of overlapping blocks used to refine the feature map 91 of the current overlapping block may be greater or less than 4.

If there is a coefficient missing from the feature map 91, the feature-map refinement module 145 may replace the missing coefficient with an average or a distance-weighted average of coefficients in the respective feature maps 92, 93, 94 and 95, corresponding to the missing coefficient.

The feature-map refinement module 145 compares the coefficients of the feature map 91 with their respective counterparts of each of the feature maps 92, 93, 94 and 95 and determines based on the results of the comparison that coefficients whose values are significantly discrepant from the values of respective corresponding coefficients of each of the feature maps 92, 93, 94 and 95 are incorrect coefficients. That is, if the difference between the value of a predetermined coefficient of the feature map 91 and the values of coefficients of the feature maps 92, 93, 94 and 95, corresponding to the predetermined coefficient of the feature map 91, exceeds a predefined threshold, the feature-map refinement module 145 determines that the predetermined coefficient of the feature map 91 is an abnormal coefficient, and replaces the predetermined coefficient of the feature map 91 with an average or a distance-weighted average of the values of the coefficients of the feature maps 92, 93, 94 and 95.

Once the coefficient corresponding to the missing coefficient and/or the incorrect coefficient of the feature map 91 are refined in the above-mentioned manner, the feature map 91 is converted into a refined feature map 96, as illustrated in FIG. 9.

The filter application module 150 deblurs the current overlapping block by using a deconvolution filter to filter the refined feature map of the current overlapping block. Examples of the deconvolution filter include a Wiener filter and a Lucy-Richardson filter.

A Wiener filter $H_w$ may be defined by Equation (3):

$$H_w(u, v) = \frac{D^*(u, v)}{D^*(u, v)D(u, v) + \frac{S_n(u, v)}{S_i(u, v)}} \quad (3)$$

where u and v are two coordinate components in a frequency domain, D(u,v) indicates a PSF obtained by converting a refined PSF to a frequency domain, $D^*(u,v)$ is a conjugate of the PSF D(u,v), $S_n(u,v)$ is a power spectrum of noise, and $S_i(u,v)$ is a power spectrum of an ideal image.

The convolution between the Wiener filter $H_w$ and an image portion including a pixel to be filtered is made by applying the Wiener filter $H_w$ to the image portion. Then, a filtered pixel value, i.e., a deblurred pixel value is obtained. This process may be performed repeatedly on one overlapping block, thereby deblurring the entire overlapping block.

The operations of the block estimation module 130, the feature-map generation module 140, and the filter application module 150 are performed in units of overlapping blocks and are thus repeatedly performed until the processing of all the overlapping blocks generated by the block generation module 120 is completed.

The blending module 160 generates a blurred image by blending a plurality of deblurred overlapping blocks obtained by the filter application module 150. Since the deblurred overlapping blocks are partially redundant, the deblurred overlapping blocks need to be processed in order to restore an image from the deblurred overlapping blocks. The reliability of data is higher near the center of each of the deblurred overlapping blocks than near the edges of each of the deblurred overlapping blocks since portions of an image corresponding to the edges of the deblurred overlapping blocks are likely to be redundant and a camera-to-subject distance represented by the portions of the image corresponding to the edges of the deblurred overlapping blocks is likely to be discrepant from a camera-to-subject distance represented by portions of the image corresponding to middle portions of the deblurred overlapping blocks.

Therefore, when the deblurred overlapping blocks have a size of 100×100 and the distance (i.e., the distance a of FIG. 2) between the left sides of a pair of adjacent deblurred overlapping blocks is 50, the blending module 160 may restore a deblurred image using a plurality of 50×50 sub-blocks which are cut out from the middle portions of the respective deblurred overlapping blocks.

Figure 11:
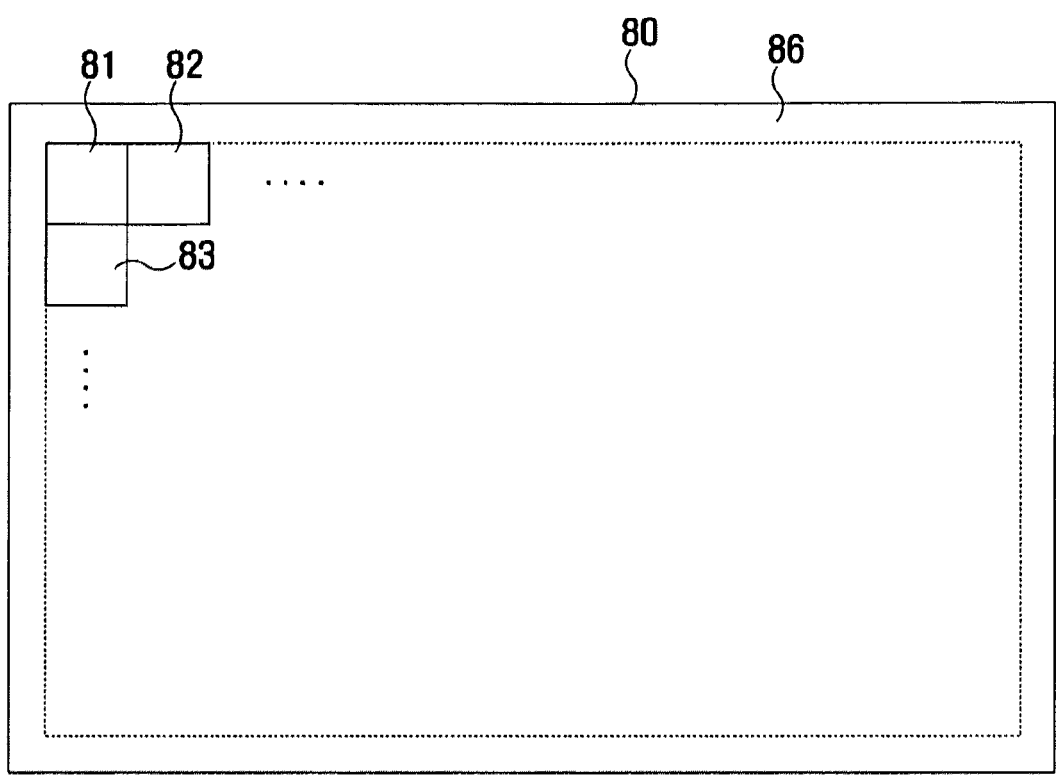
FIG. 11 illustrates a diagram for explaining a process of restoring a deblurred image using sub-blocks.

More specifically, referring to FIG. 11, the blending module 160 fills an output image area 80 with a plurality of sub-blocks (81, 82 and 83) of the deblurred overlapping blocks. Edge portions 86 of the output image area 80 are not filled with any sub-blocks but restored based on deblurred overlapping blocks corresponding to the edge portions 86 since the deblurred overlapping blocks corresponding to the edge portions 86 are not overlapped by other deblurred overlapping blocks.

Therefore, it is possible to provide a clear deblurred image against noise and errors by dividing an input image into a plurality of overlapping blocks, deblurring the overlapping blocks and restoring the input image only using sub-blocks of the deblurred overlapping blocks.

Figure 12:
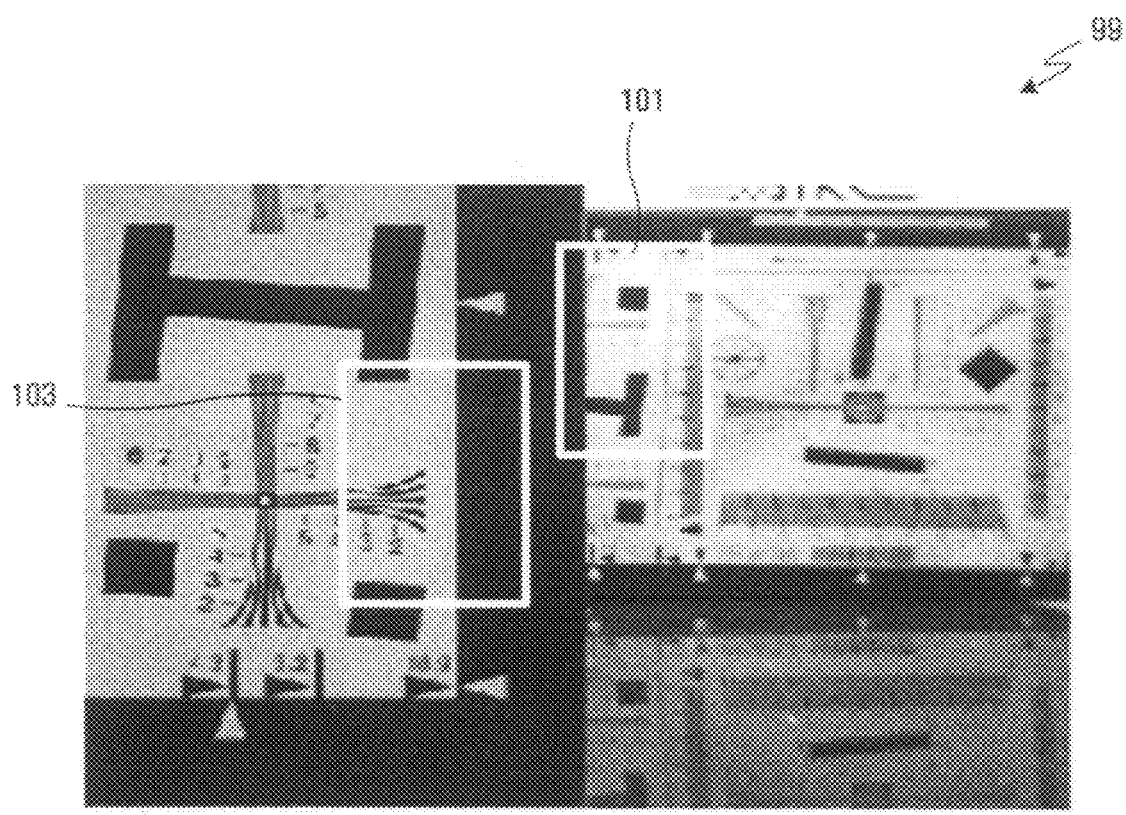
FIGS. 12 through 14 illustrate deblurred images obtained by exemplary embodiments of the present invention.
Figure 13:
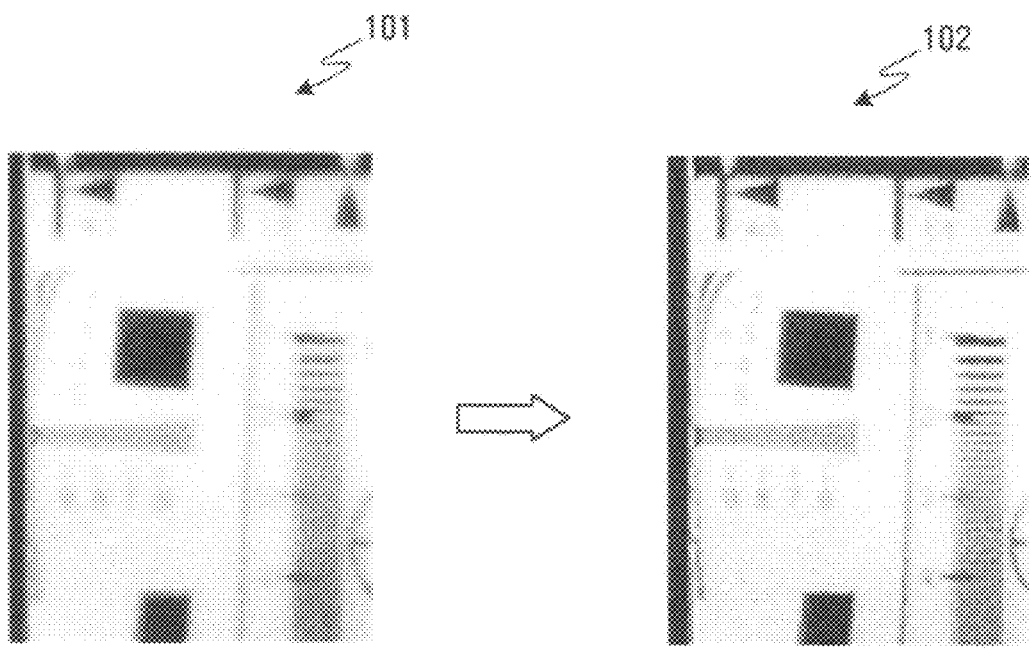
Figure 14:
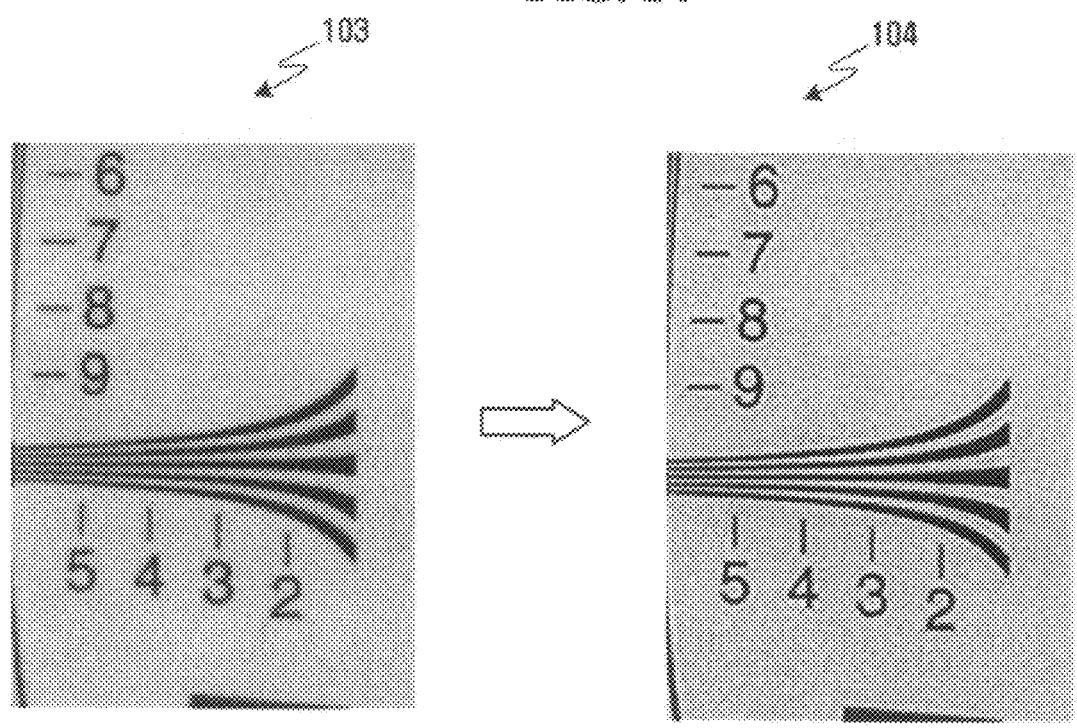

FIGS. 12 through 14 illustrate deblurred images obtained by the exemplary embodiments of the present invention. More specifically, FIG. 12 illustrates two input images 99, i.e., an image 101 corresponding to a subject-to-lens distance of 120 cm and an image 103 corresponding to a subject-to-lens distance of 45 cm, FIG. 13 illustrates part of the image 101 and an image 102 obtained by deblurring the image 101, and FIG. 14 illustrates part of the image 103 and an image 104 obtained by deblurring the image 103. Referring to FIGS. 12 through 14, the present invention can provide excellent deblurring performance regardless of the distance between a subject and a lens.

The term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to the present invention, it is possible to improve the sharpness of an image having a varying level of blur according to a subject-to-camera distance by applying a filter that is locally appropriate for the image. In addition, it is possible to overcome the problems associated with the conventional global PSF-based or local PSF-based deblurring methods, such as color defects or the deterioration in the quality of restored close-range images.

Moreover, the present invention can contribute to the miniaturization of cameras and decrease the manufacturing cost of cameras by replacing the existing automatic focus (AF) function that requires actuators with a digital AF function based on image processing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image restoration apparatus comprising:
    a block generation module which generates a plurality of overlapping blocks for an input image;
    a blur estimation module which generates a plurality of unit step responses for a current overlapping block from the overlapping blocks;
    a feature-map generation module which generates a feature map for the current overlapping block based on the unit step responses of the current overlapping block;
    a filter application module which deblurs, by a computer processor, the current overlapping block by using a deconvolution filter to filter the feature map of the current overlapping block; and a blending module which generates a deblurred image of the input image by using a plurality of sub-blocks, the sub-blocks comprising middle portions of the respective overlapping blocks, wherein the size of each of the overlapping blocks is less than the size of the input image.

2. The image restoration apparatus of claim 1, further comprising a feature-map refinement module which refines an abnormal coefficient in the feature map of the current overlapping block by using feature maps of overlapping blocks that are adjacent to the current overlapping block.

3. The image restoration apparatus of claim 2, wherein, if the abnormal coefficient is missing from the feature map of the current overlapping block, the feature-map refinement module refines a coefficient obtained by calculating an average or a distance-weighted average of coefficient values of the feature maps of the adjacent overlapping blocks.

4. The image restoration apparatus of claim 2, wherein, if the abnormal coefficient is an incorrect coefficient, the feature-map refinement module determines whether differences between a value of the incorrect coefficient and values of coefficients of the feature maps of the adjacent overlapping blocks exceed a predetermined threshold value, and, if the differences exceed the predetermined threshold value, the feature-map refinement module refines the incorrect coefficient by calculating an average of or a distance-weighted average of the coefficient values of the feature maps of the adjacent overlapping blocks.

5. The image restoration apparatus of claim 1, wherein the blur estimation module detects edges of the current overlapping block, extracts a valid edge from the detected edges, generates a unit step response for each of a plurality of pixels included in the valid edge, and generates a representative step response by superimposing the unit step responses on one another.

6. The image restoration apparatus of claim 5, wherein the blur estimation module uses one or more Sobel masks that represent different directions.

7. The image restoration apparatus of claim 1, wherein the feature-map generation module determines a distance between a camera and a subject by comparing a blur level of the current overlapping block with blur levels of a plurality of images captured at various distances from the camera, and then estimates a point spread function (PSF) based on the determined distance.

8. The image restoration apparatus of claim 1, wherein the feature-map generation module searches a sigma value of a Gaussian blur filter that matches the blur level of the representative step response and generates a Gaussian distribution for the searched signal value.

9. The image restoration apparatus of claim 1, wherein the feature-map generation module generates a matrix for estimating a PSF based on the blur level of the current overlapping block, and estimates a PSF based on the blur level of the current overlapping block using the matrix.

10. The image restoration apparatus of claim 1, wherein the deconvolution filter is a Wiener filter or a Lucy-Richardson filter.

11. An image capturing system comprising:
a photographing element which captures an image of a subject;
a driving circuit which adjusts a lens and a diaphragm; and
an image restoration apparatus which deblurs the image captured by the photographing element,
wherein the image restoration apparatus comprises:
a block generation module which generates a plurality of overlapping blocks for an input image;
a blur estimation module which generates a plurality of unit step responses for a current overlapping block from the overlapping blocks;
a feature-map generation module which generates a feature map for the current overlapping block based on the unit step responses of the current overlapping block;
a filter application module which deblurs the current overlapping block by using a deconvolution filter to filter the feature map of the current overlapping block; and
a blending module which generates a deblurred image of the input image by using a plurality of sub-blocks, the sub-blocks comprising middle portions of the respective overlapping blocks,
wherein the size of each of the overlapping blocks is less than the size of the input image.

12. An image restoration method comprising:
generating a plurality of overlapping blocks for an input image;
generating a plurality of unit step responses for a current overlapping block from the overlapping blocks;
generating a feature map for the current overlapping block based on the unit step responses of the current overlapping block;
deblurring the current overlapping block by using a deconvolution filter to filter the feature map of the current overlapping block; and
generating a deblurred image of the input image by using a plurality of sub-blocks, the sub-blocks comprising middle portions of the respective overlapping blocks,
wherein the size of each of the overlapping blocks is less than the size of the input image.

13. The image restoration method of claim 12, further comprising refining an abnormal coefficient in the feature map of the current overlapping block by using feature maps of overlapping blocks that are adjacent to the current overlapping block.

14. The image restoration method of claim 13, wherein, if the abnormal coefficient is missing from the feature map of the current overlapping block, the refining the abnormal coefficient comprises refining a coefficient obtained by calculating an average or a distance-weighted average of coefficient values of the feature maps of the adjacent overlapping blocks.

15. The image restoration method of claim 13, wherein, if the abnormal coefficient is an incorrect coefficient, the refining the abnormal coefficient comprises:
determining whether differences between a value of the incorrect coefficient and values of coefficients of the feature maps of the adjacent overlapping blocks exceed a predetermined threshold; and
if the differences exceed the predetermined threshold value, refining the incorrect coefficient by calculating an average of or a distance-weighted average of the coefficient values of the feature maps of the adjacent overlapping blocks.

16. The image restoration method of claim 12, wherein the generating the unit responses comprises:
detecting edges of the current overlapping block;
extracting a valid edge from the detected edges;
generating a unit step response for each of a plurality of pixels included in the valid edge; and
generating a representative step response by superimposing the unit step responses on one another.

17. The image restoration method of claim 16, wherein the detecting the edges of the current overlapping block comprises detecting the edges of the current overlapping block by using one or more Sobel masks that represent different directions.

18. The image restoration method of claim 12, wherein the generating the feature map comprises:
   determining a distance between a camera and a subject by comparing a blur level of the current overlapping block with blur levels of a plurality of images captured at various distances from the camera; and
   estimating a point spread function (PSF) based on the determined distance.

19. The image restoration method of claim 12, wherein the generating the feature map comprises:
   searching for a sigma value of a Gaussian blur filter that matches the blur level of the representative step response; and
   generating a Gaussian distribution for the searched signal value.

20. The image restoration method of claim 12, wherein the generating the feature map comprises:
   generating a matrix for estimating a PSF based on the blur level of the current overlapping block; and
   estimating a PSF based on the blur level of the current overlapping block by using the matrix.

21. The image restoration method of claim 12, wherein the deconvolution filter is a Wiener filter or a Lucy-Richardson filter.

* * * * *